June 20, 1944.  G. B. LINDERMAN, JR  2,351,864
DUST COLLECTOR
Filed June 27, 1940  3 Sheets-Sheet 1
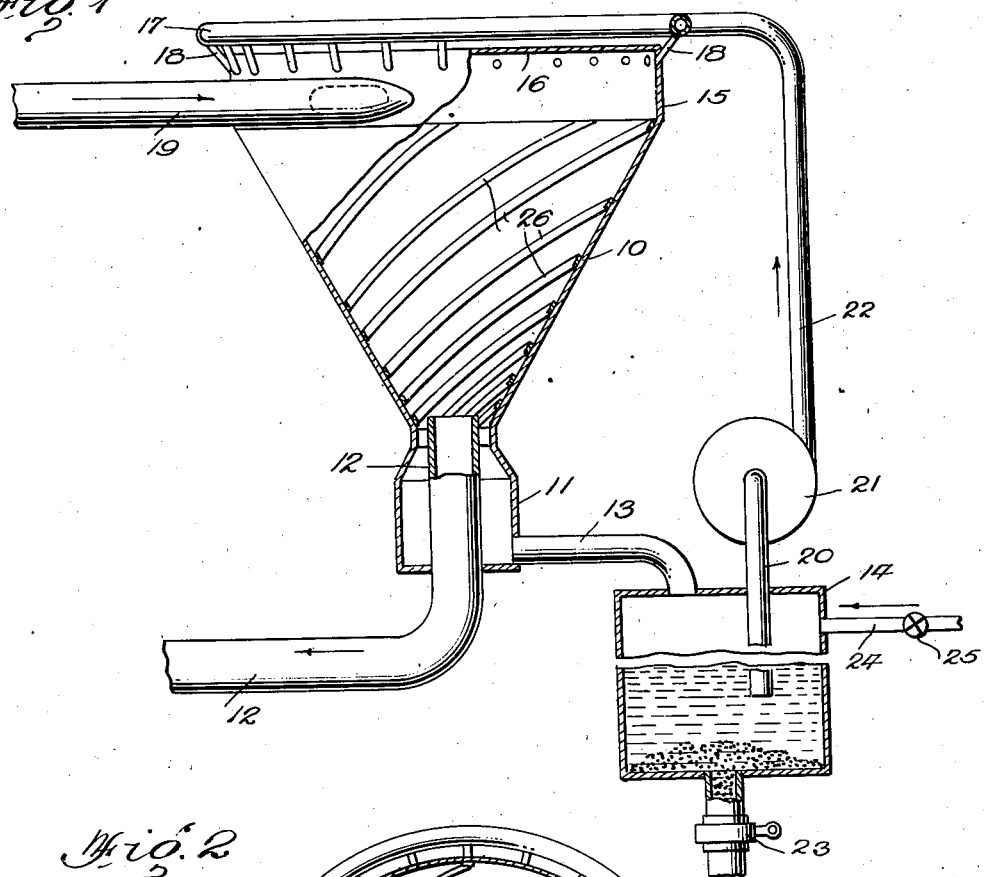
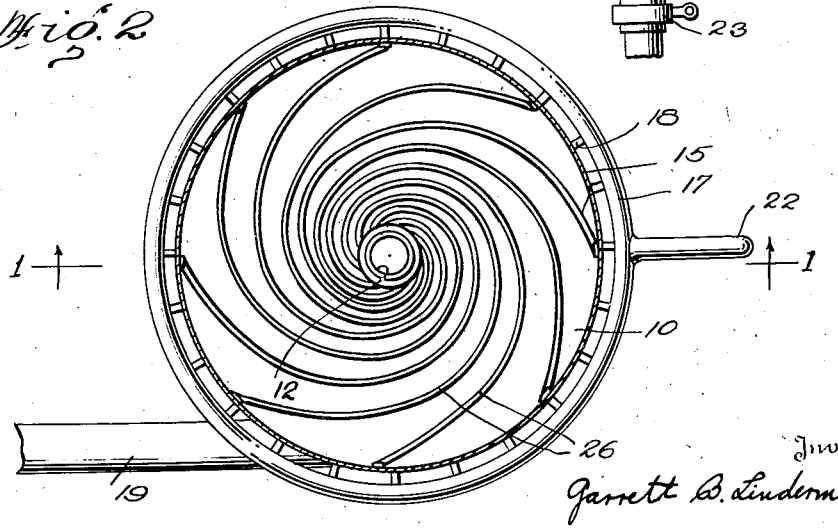
Inventor
Garrett B. Linderman, Jr.
By Watson, Cole, Grindle & Watson
Attorney

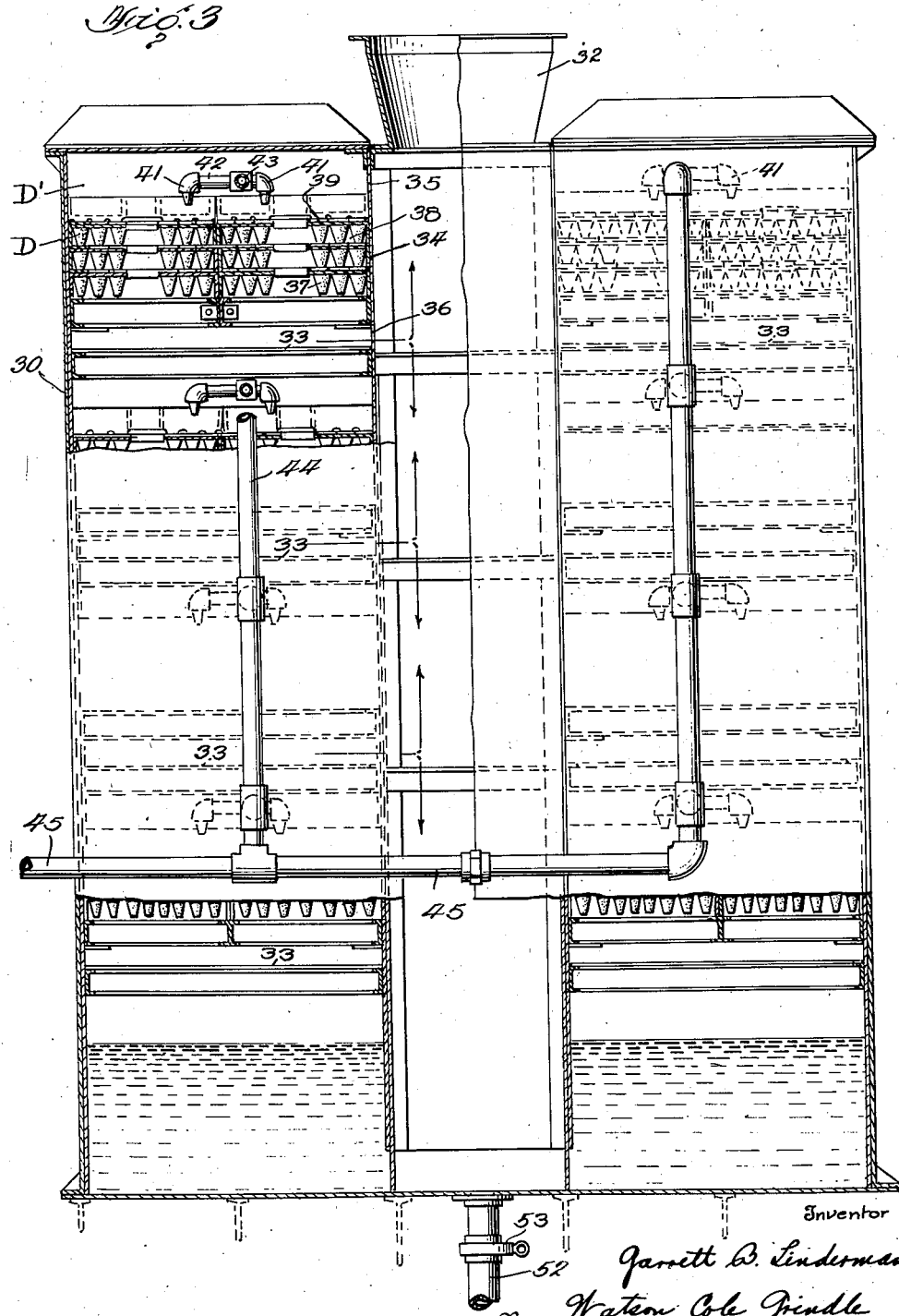

June 20, 1944.　　　G. B. LINDERMAN, JR　　　2,351,864
DUST COLLECTOR
Filed June 27, 1940　　　3 Sheets-Sheet 3
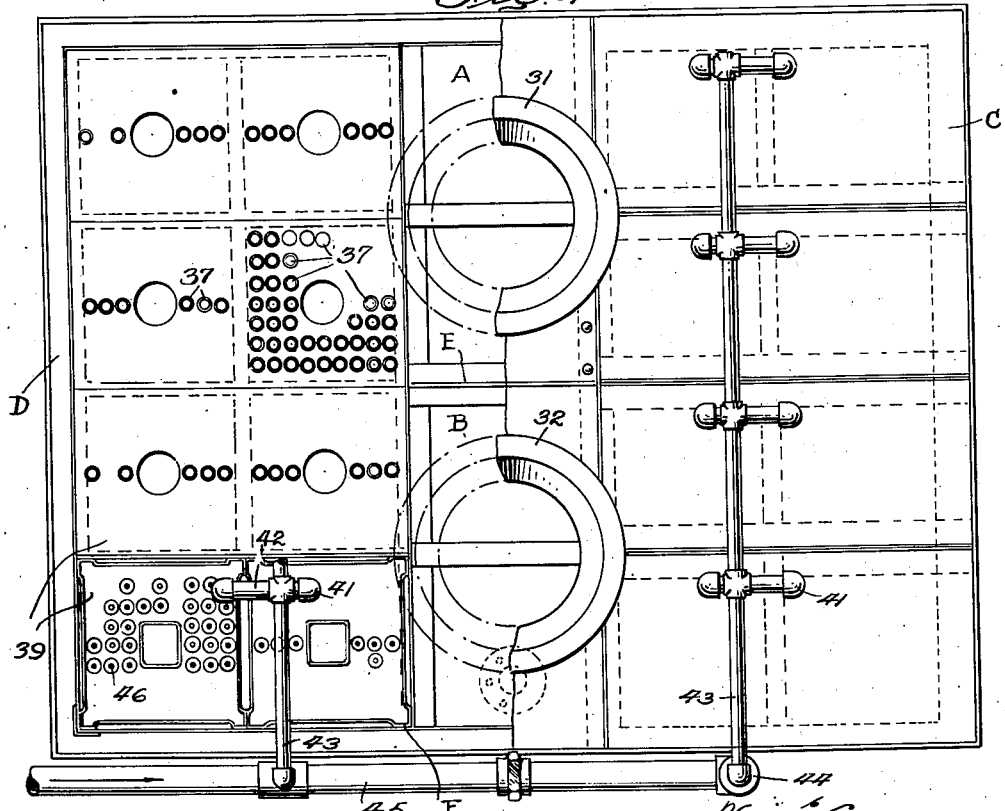
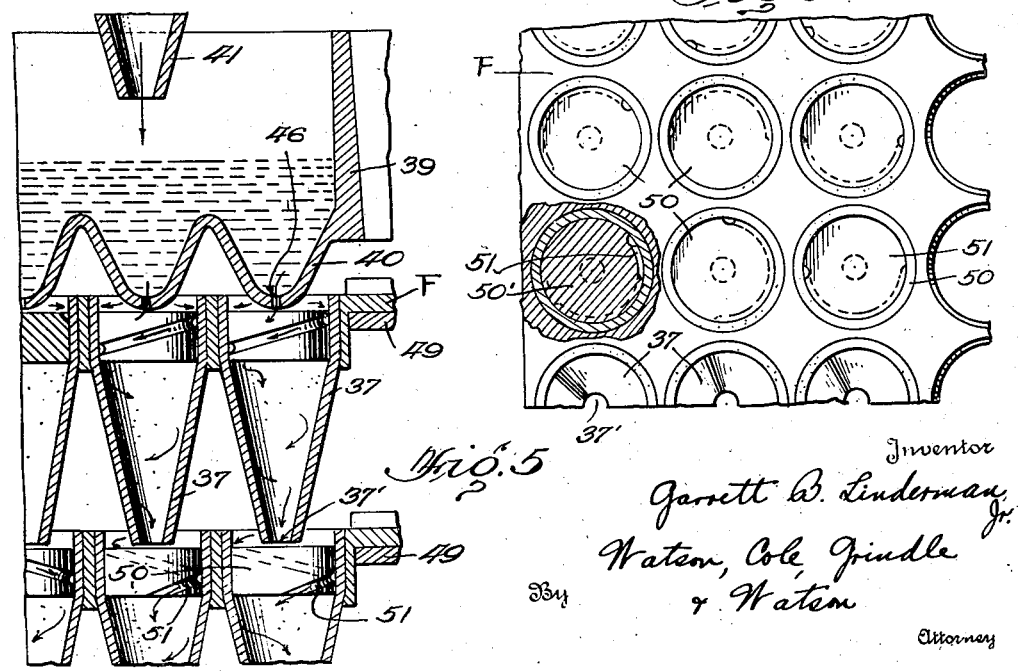

Patented June 20, 1944

2,351,864

UNITED STATES PATENT OFFICE 2,351,864

DUST COLLECTOR

Garrett B. Linderman, Jr., Hagerstown, Md.

Application June 27, 1940, Serial No. 342,785

10 Claims. (Cl. 261—79)

This invention relates to apparatus for effecting the rapid and economical separation from a gas of particles of solid matter held in suspension thereby. It is adapted for use in the removal of such particles from many types of gases but is particularly well suited for use in removing dust from atmospheric air.

The principal object of the present invention is to provide a dust collector of a simple, economical, and rugged construction, which may be made in small sizes for household use or large sizes for commercial installations. In one of the embodiments to be described, the dust collector of the present invention has no moving parts whatsoever, and is therefore especially adapted for trouble-free operation. It is also an object of the present invention to provide certain improvements upon the dust collecting apparatus described and claimed in my copending application Serial No. 267,484, of which the present application is a continuation-in-part.

In accordance with the invention, the gas which contains the dust particles or foreign bodies is caused to revolve at high velocity about an axis, thus throwing the contained solid particles outwardly toward the periphery of the revolving gaseous body by centrifugal action. Enveloping the body of whirling gas is a liquid film and the solid particles thus thrown outwardly by the gas strike and are entrapped by the liquid film, practically all of such particles being thus removed from the gas and entrapped by the liquid. Preferably the apparatus is so designed that the operation may be carried on continuously, a stream of gas being caused to enter the apparatus at one point, thereafter caused to rapidly whirl to effect discharge of its contained particles, and being withdrawn from the apparatus at another point, the liquid of the enveloping film likewise being continuously replaced. The apparatus is thus capable of serving continuously in the purification of the air introduced into a dwelling house, apartment, theatre or commercial plant, and effects a high degree of purification of the air.

A feature of the method described and claimed in my above-mentioned copending application is that the gas to be cleaned is moved in a generally helical path of progressively decreasing radius so that its contained particles are thrown outward, against a liquid film, by centrifugal action with progressively increasing force. An object of the present invention is the provision of a novel, convenient and highly effective apparatus for carrying out such method.

Within the scope of the invention various forms of apparatus for practicing the method may be devised. In the accompanying drawings two such forms of apparatus are illustrated by way of example.

In the drawings:

Figure 1 illustrates, partly in elevation and partly in vertical section, one form of dust collector constructed in accordance with the present invention;

Figure 2 is a plan view of the device of Figure 1;

Figure 3 illustrates, partly in elevation and partly in vertical section, a second embodiment of the present invention;

Figure 4 is a plan view of the device of Figure 3, a part of the casing being broken away to illustrate the interior;

Figure 5 is an enlarged fragmentary vertical section illustrating certain elements of the device of Figures 3 and 4; and Figure 6 is a detail view, in plan, of the elements illustrated in Figure 5.

That form of the invention shown in Figures 1 and 2 will now be described. In this form the apparatus consists essentially of a stationary frusto-conical member 10 with axis disposed vertically and the apex or small end lowermost. The opening in the lower end of the frusto-conical member is in communication with the upper end of a secondary chamber 11. An outlet for gas from which dust or particles has been removed is indicated at 12 and it will be seen that this outlet is disposed axially of member 10 and projects upwardly through chamber 11 and into the lower end of the frusto-conical member 10, the upper end of conduit 12 being slightly above the most restricted diameter of the frusto-conical member 10. A liquid drain pipe is indicated at 13 and connects the chamber 11 to a tank 14, for the reception of liquid collected in chamber 11. Secured to the upper edge of the frusto-conical member 10 is a cylindrical member 15 surmounted by a closure plate 16. Encircling the cylindrical member 15 is a circular manifold 17 and extending downwardly and inwardly from this manifold into apertures formed in the cylindrical wall member 15 are a plurality of tubular conduits 18 of small diameter. A conduit for introducing gas into the chamber defined by the frusto-conical member 10, the cylindrical member 15, and the top 16, is indicated at 19, conduit 19 being so disposed as to discharge a stream of gas tangentially into the cylindrical member 15.

A liquid circulating pump is indicated at 21 and the inlet port of this pump is supplied with liquid from tank 14 through the conduit 20, which extends into tank 24 through an aperture in its top, the lower end of conduit 20 being at all times below the level of the liquid in this tank. The outlet port of pump 21 is connected by means of a conduit 22 with the manifold 17 and, when the pump 21 is in operation, liquid is lifted from the tank 14 to the manifold 17.

A discharge conduit extends downwardly from tank 14 but is normally closed by a valve 23. This valve may be operated to drain the tank whenever desired and to effect discharge of the collected dust particles. A liquid inlet pipe is indicated at 24, inflow of liquid into tank 14 through this pipe being controlled by a manually operable valve 25.

To the inner surface of the frusto-conical member 10 are riveted or otherwise suitably secured a plurality of strips indicated at 26, which may be designated ribs, and which spiral downwardly from the upper edge of the frusto-conical member in the same direction that the gas introduced through pipe 19 will flow toward the lower end of the separating chamber. In other words, if the gas inlet is arranged so as to cause a counterclockwise whirl of the gas within the gas separating chamber (looking downwardly from the top as shown in Figure 2), the ribs also incline in a counter-clockwise direction from top to bottom. All of these ribs terminate at or close to the restricted port at the lower end of frusto-conical member 10. This embodiment of the invention is caused to operate as follows:

The tank 14 is completely filled with the liquid to be used, such for instance as water, and the pump 21 is then started. The liquid is thus delivered to the manifold 17 from which it is conducted to the inner surface of the cylindrical section 15 of the separating chamber through the pipes 18. The pressure of the pump and the dimensions of the water conducting pipes, including pipes 18, are so regulated that the water issuing to the separating chamber into the pipes 18 will simply trickle down the inner wall surface of the cylindrical surface 15 instead of being projected into the interior of the chamber in the form of streams.

Such water introduced into the separating chamber will continue downwardly, flowing over the frusto-conical inner surface of member 10 and finally reaching chamber 11, from which it is removed to tank 14 through pipe 13.

As has previously been explained, gas is projected from the gas discharge tube 19 into the separating chamber at high velocity which causes such gaseous stream to describe a spiral path downwardly from the top of the separating chamber to the inlet port of the gas discharge pipe 12. The friction of the gas against the liquid film on the inside of the frusto-conical member 10 tends to drive the liquid around on the inner surface of member 10 in the same direction. Centrifugal force maintains the liquid film in contact with the inner surface of member 10 and the ribs or strips 26 function to direct the liquid downwardly, these ribs serving as guiding vanes. Without the ribs or strips 26, and in the event that the rotational velocity acquired by the liquid under the influence of the gas was sufficiently high, the liquid would be forced upwardly over the frusto-conical inner surface of member 10 and thus proper circulation of the liquid in the system prevented. It is not absolutely necessary that the ribs or strips 26 be spirally disposed as illustrated, although this is preferred and most efficient. Strips disposed in vertical planes will function in a satisfactory manner. As the gas rotates in its passage from conduit 17 to conduit 12, or whirls rapidly within the operating chamber, the suspended solid particles therein are thrown outwardly by centrifugal action and contact with the liquid film flowing over the inner wall surface of the separating chamber, thus being captured by such liquid.

That form of the invention illustrated in Figures 3–6, is especially adapted for large installations, as in theatres, auditoriums, industrial plants, and the like. In this form, the invention comprises a rectangular casing indicated generally at 30, which is divided by vertical partitions into compartments A, B, C and D as seen in Figure 4. Compartments C and D extend from front to rear of the casing at each end thereof, while compartments A and B lie between compartments C and D and are separated from each other by vertical partition E. The casing walls and partitions may be of sheet metal or other suitable material.

Compartments A and B comprise inlet and outlet means for the gas to be treated, while compartments C and D contain the dust-collecting means in which the gas is treated. Compartment A opens, at its upper end, into an adapter 31 to which is connected the conduit for incoming gas (not shown), while compartment B opens into an adapter 32 which is similarly connected to a conduit for the outgoing, dust-free gas. A blower (not shown) may be located either in the inlet conduit or outlet conduit for maintaining the necessary pressure gradient in the dust-collecting apparatus.

Each of the compartments C and D is divided, by horizontal partitions 33, into a plurality of chambers disposed one above the other. Since the compartments C and D, with their associated apparatus, are identical, and since the respective chambers of each compartment are likewise identical, it will be necessary to describe only one of the latter, and for that purpose the upper chamber D' in compartment D, seen at the upper left corner of Figure 3, will be described in detail.

The partition 34 which separates compartment D from compartments A and B is provided with a horizontally elongated port 35 through which the upper part of the chamber D' communicates with compartment A, and with a similar port 36 connecting the lower part of chamber D' with compartment B. Gas entering the chamber from compartment A is therefore constrained to pass downwardly through the chamber and through the dust-collecting apparatus to be described, after which it passes out through port 36 into compartment B and upwardly through the adapter 32. Arranged within the chamber D' are a plurality of tiers of dust-collecting receptacles 37, the receptacles being disposed in register, one above the other, so that each receptacle of the upper tiers discharges into a similar receptacle immediately beneath. The receptacles 37 of the several tiers are supported in any suitable manner, so as to constitute a partition extending across the chamber D', in order that the gas to be cleaned must pass downwardly through the receptacles, and not around them. A suitable means of arranging the receptacles to effect this purpose will be hereinafter described.

Above the upper tier 38 of receptacles 37 there is provided means for receiving a supply of water or other suitable liquid, and for permitting such water or other liquid to trickle down through the receptacles 37 in a special manner to be described. The water-receiving means may suitably comprise a plurality of trays 39, supported from the walls of the casing 30, each tray 39 being formed with a plurality of wells 40, as best seen in Figure 5, one such well 40 being disposed immediately above each receptacle 37 of the upper tier 38. The trays 39 are supplied with water through the nozzles 41 from a water distribution system comprising horizontal conduits 42, 43, vertical header 44, and lower horizontal conduit 45, the rate of supply being controlled by any suitable means (not shown). Each well 40 is provided with a small orifice 46 at its lower extremity, to permit water to trickle down upon and through the dust-collecting receptacles 37 in the manner hereinafter described. The trays 39, one of which is illustrated in plan in Figure 4, are provided with central apertures 47 through which the dust-laden gas passes downwardly to the receptacles 37 arranged in tiers below the trays 39. The gas must of course pass successively through the several tiers of receptacles, since each tier, as pointed out above, constitutes a horizontal partition across the chamber D'.

As best seen in Figures 4, 5 and 6, each tier of receptacles 37 preferably comprises a plurality of units, each comprising a plurality of the receptacles 37 supported in a frame or tray F. These receptacles 37 may be made of any suitable material, but for economy, it is preferred to make them of ceramic material, suitably glazed, which has been found to be entirely satisfactory. The receptacles rest upon and engage the trays F in a substantially gas-tight manner. The units are therefore impervious to gas, apart from the passages provided through the receptacles themselves, and may be supported in a substantially gas-tight manner on suitable flanges provided on the interior of the casing 30 as, for example, the flanges 49 of Figure 5.

As in the previous embodiment, each receptacle 37 is frusto-conical in form, having its smaller end downward, and having an aperture 37' at the lower end thereof. The upper end of each receptacle 37 is substantially closed by a plug 50, which may likewise be inexpensively formed of ceramic material. The plugs 50 are provided with downwardly inclined or spiral peripheral grooves 51, each of which constitutes a spiral passage or conduit into the corresponding receptacle 37. In Figure 6 several of the plugs 50 are seen in plan, one plug 50' being illustrated in horizontal section.

The gas entering chamber D' under pressure, is caused to pass into the several receptacles 37 through the conduits 51, thus acquiring a spiral motion downwardly through the several receptacles. A thin layer of water from the trays 39 is maintained on top of the plugs 50 at all times, and as the gas to be cleaned passes downwardly through the spiral conduits 51, a suitable proportion of water is entrained and carried downwardly into the receptacles 37, where the water is caused, by centrifugal action due to the momentum of the gas, to be distributed over the inner wall of the receptacle and to pursue a spiral path downwardly to the orifice 37'. As the gas spirals downwardly through the receptacle 37, the particles of dust or other solids contained therein will be thrown outwardly onto the film of water covering the inner wall of the receptacle, and will be trapped as hereinbefore explained. The gas and dust-containing water passing downwardly through the orifice 37' of a receptacle of the upper tier 38 continues downwardly, in the same manner, through the corresponding receptacles 37 of the succeeding tiers until it reaches and passes through the lowest tier of receptacles in the chamber D'. The gas and dust-containing water then pass out through the port 36 into compartment B wherein they separate, the gas passing upwardly and out through the adapter 32, while the dust-laden water falls to the bottom of the casing 30. The walls of compartment B terminate a short distance above the bottom of the casing 30, so that the dust-laden water may be distributed over substantially the entire area of the latter.

The conduit 52 connecting with the bottom of the casing 30 is provided for discharging dust-laden water from the latter, and is controlled by any suitable valve means 53.

In the present embodiment, it is contemplated that the water will be supplied, under normal pressure, from the municipal or other common water supply, and that the dust-laden water collecting in the casing 30 will be discarded to the sewer. However, in lieu of these arrangements a pump may be provided, as in the case of the device of Figure 1, for recirculating a portion of the water. It will of course be understood that the compartments C and D may be of any desired size, and the number of chambers D' may be varied at will. Similarly, the size and number of the receptacles 37 may be varied, as well as the number of tiers of receptacles contained within each chamber. Preferably, the receptacles 37 are assembled in units, as described, of a size suitable for easy handling.

Having thus described the invention, what is claimed as new and desired to be secured by Letters Patent is:

1. In a dust collector, in combination, a stationary frusto-conical receptacle having its larger end upward and having an outlet aperture at its lower end, a closure for the upper end of said receptacle, said closure being formed to provide a helical conduit opening into said receptacle at its upper end, and means for introducing water and dust-containing gas into said receptacle through said conduit.

2. In a dust collector, in combination, a stationary frusto-conical receptacle having its larger end upward and having an outlet aperture at its lower end, a closure for the upper end of said receptacle, said closure being formed to provide a helical conduit opening into said receptacle at its upper end, means for maintaining a layer of water on top of said closure, and means for supplying gas under superatmospheric pressure above said receptacle and closure, whereby a stream of gas and entrained water is caused to enter said receptacle through said conduit.

3. In a dust collector, in combination, a casing, a plurality of frusto-conical receptacles arranged in horizontal series and constituting a horizontal partition across the interior of said casing, each said receptacle having an outlet aperture at its lower end, closures for the upper ends of said receptacles, each said closure being formed to provide a helical conduit opening into its respective receptacle, means for maintaining a layer of water on top of each said closure, means for introducing dust-containing gas into said casing above said receptacles, and means for maintaining a difference of pressures on opposite sides of said series of receptacles, the higher pressure being on the upper side thereof.

4. In a dust collector, in combination, a casing, a plurality of vertically spaced horizontal series of frusto-conical receptacles, each said series constituting a horizontal partition across the interior of said casing, each said receptacle having an outlet aperture at its lower end, closures for the upper ends of said receptacles, each said closure being formed to provide a helical conduit opening into its respective receptacle, means for maintaining a layer of water on top of each said closure, means for introducing dust-containing gas into said casing above said uppermost series of receptacles, and means for maintaining a descending pressure gradient across said several series of receptacles from top to bottom.

5. The combination set forth in claim 4 the said several series of receptacles being disposed in vertical register, whereby the respective receptacles of the uppermost series discharge onto the closures of the corresponding receptacles of the next lower series, and so on.

6. The combination set forth in claim 3, said means for maintaining a water layer on each said closure comprising a receptacle supported above said closures and having an aperture disposed above each said closure, and means for maintaining a supply of water in said last-mentioned receptacle.

7. In a dust collector, in combination, a stationary frusto-conical receptacle having means at its larger end for introducing a stream of dust laden gas and a stream of water, directed tangentially to the surface of the receptacle, and an aperture at its smaller end for the withdrawal of gas and water.

8. In a dust collector, in combination, a stationary frusto-conical receptacle having means at its larger end for introducing a stream of dust-containing gas and a plurality of streams of water at points spaced about its inner wall, said streams being directed tangentially to the surface of the receptacle, and an aperture at its smaller end for the withdrawal of gas and water.

9. The combination set forth in claim 8 in which the inner face of said receptacle is provided with spiral vanes for guiding the water introduced, to the outlet aperture.

10. In a dust collector, in combination, a stationary frusto-conical receptacle having its larger end uppermost and having an outlet aperture in its lower smaller end, said receptacle also having means at its upper end for directing a stream of dust-containing gas into said receptacle tangentially to the inner surface thereof, means for directing a stream of dust-containing gas, so introduced, in a downward spiral within said receptacle, and means for directing a stream of water against the inner wall of said receptacle at the upper end thereof, whereby said water is distributed over said wall by the motion imparted to the water by the gas.

GARRETT B. LINDERMAN, Jr.